No. 723,700. PATENTED MAR. 24, 1903.
W. B. MAY.
SHAVING GLASS.
APPLICATION FILED APR. 25, 1902.
NO MODEL.
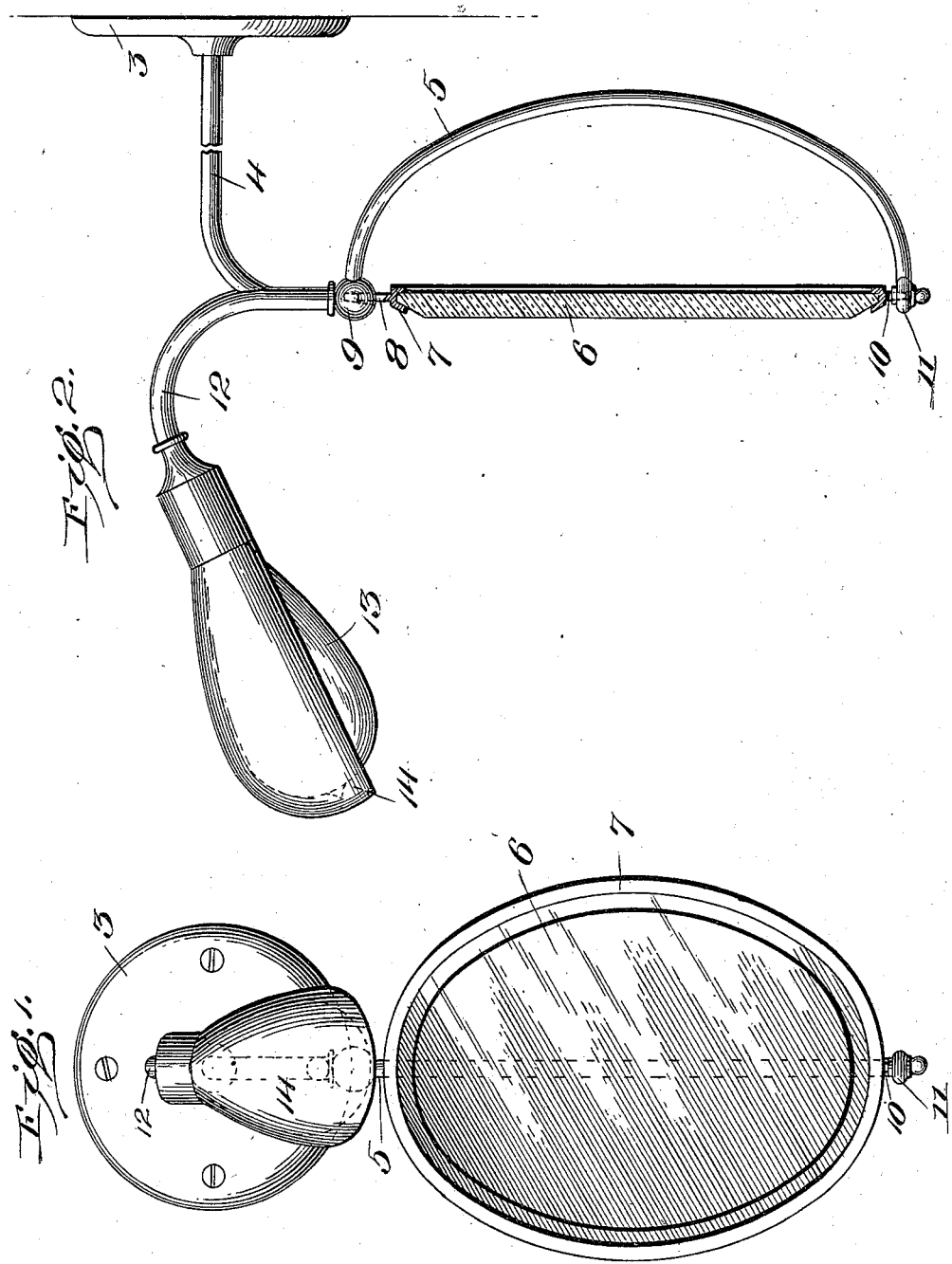
WITNESSES:
Allan Foose.
H. M. Seamans
INVENTOR
William B. May
BY
Duell, Megrath & Warfield
ATTORNEYS

UNITED STATES PATENT OFFICE.

WILLIAM B. MAY, OF NEW ROCHELLE, NEW YORK.

SHAVING-GLASS.

SPECIFICATION forming part of Letters Patent No. 723,700, dated March 24, 1903.

Application filed April 25, 1902. Serial No. 104,597. (No model.)

*To all whom it may concern:*

Be it known that I, WILLIAM B. MAY, residing at New Rochelle, in the county of Westchester and State of New York, have invented certain new and useful Improvements in Shaving-Glasses, of which the following is a full, clear, and exact description, such as will enable others skilled in the art to which it appertains to make and use the same.

This invention relates to a shaving glass or fixture; and its object is to provide an improved fixture especially adapted for use as a shaving-glass, but capable of use in a variety of relations.

To this end the invention consists in the features of construction, combinations of elements, and arrangement of parts hereinafter fully set forth and the novel features of which will be specifically pointed out in the claims at the end of this specification.

In the accompanying drawings, Figure 1 is a front elevation of the fixture. Fig. 2 is a side elevation showing the mirror or glass in section.

Similar reference characters refer to similar parts throughout both views.

The fixture is supported by means of a wallplate 3, adapted to be used in convenient relation to a wall. An arm 4, projecting from this plate, carries the bracket or support 5, which is shown as semicircular in form, so that the mirror 6 supported thereby can swivel freely with relation thereto. The mirror 6 is carried by a frame 7, which has at the upper side thereof a lug or swivel-post 8, which is adapted to enter a socket in the bracket, as at the point 9, and be loosely held therein. A similar swivel-post 10 rests in a socket at the lower end of the bracket, as at 11, and thus the mirror can be swung freely about a vertical axis. The respective lengths of the swivel-posts 8 and 10 and of the sockets in which they rest are such that the mirror may be easily put in place on the bracket or removed therefrom. When it is desired to remove the mirror, as may be seen from an inspection of Fig. 2, it is pushed upward until the swivel-post 10 is disengaged from the socket 11. The length of the swivel-post 8 and the depth of the socket in which it rests are such as to allow this movement. Then upon the disengagement of the swivel-post 10 and its socket the lower end of the mirror may be moved outwardly and the mirror drawn downwardly until swivel-post 8 disengages from its socket. It will of course be obvious that in order to permit this movement there must be a certain looseness in the joint between the upper swivel-post and its socket. The mirror is shown as adapted to swivel about a vertical axis. Such construction is the preferred one and gives all of the movement of the mirror necessary in use. It will be understood, however, that the mirror could be arranged to swivel about a horizontal axis or otherwise, as desired.

The construction shown provides a mirror especially adapted for use with a light, such as that shown, the location of which is an important feature of this invention from the view-point of compactness and the proper reflection of the light. An arm 12, carried by the bracket 5, supports an electric light, the bulb of which is shown at 13 and a hood or reflector therefor at 14. This light is located in front of and above the plane of the mirror, so that the rays of light are not interfered with by any one standing in front of the mirror, and the reflection is direct between the light and mirror and the person standing in front of the mirror and below the light.

The connecting-wires for the bulb will of course pass through the arms 4 and 12 and be suitably protected thereby.

I am aware that it is not new to provide an adjustable mirror in connection with a fixed source of light, such as a candle or lamp. There are peculiar advantages in this fixture, however, in that it provides a light which is located in front of and yet above the plane of the mirror, so that the light is in no way interfered with by the person standing in front of the mirror. An efficient arrangement of this sort would not be possible in any of the shaving-stands old in the art, and the advantages of my construction in efficiency and compactness will accordingly be readily apparent. For the sake of convenience and in order to get the full range of the mirror the light 13 is disposed entirely above the plane of the upper end of said mirror. It will be understood, however, that where in the claims I use the term "above the plane" of the mirror it is intended to include therein such position of the light as will locate it above and out of the way of the person standing in front of the mirror. Under certain circumstances this need not be actually above the upper end of the mirror, but should be always such as to be above the plane of the reflection of the person using it.

Various changes in detail of the construction shown which would not involve a departure from this invention will be readily suggested.

Having described my invention, what I claim as new, and desire to secure by Letters Patent, is—

1. As an article of manufacture, a shaving-glass fixture, comprising a plate adapted to be attached to a wall or ceiling, a bracket supported by said plate, a mirror vertically pivoted upon said bracket, so as to be capable of a swivel movement with relation thereto, and an arm connected to said bracket, the free end thereof carrying a source of light, the said light being in front of and substantially above the plane of said mirror, as and for the purposes set forth.

2. As an article of manufacture, a shaving-glass fixture, comprising a plate adapted to be attached to the wall or ceiling, a bracket supported by said plate, said bracket having a comparatively small socket in one end thereof and a deep upper socket in the other end thereof, a mirror-frame having lugs or swiveled posts in said sockets so arranged that said mirror-frame may be held within said brackets by means of said lugs so that it may be turned in a vertical plane and may be readily removed from said bracket, and an arm attached to the upper part of the bracket, the free end of said arm carrying a source of light said light being located in front of and above the plane of said mirror, as and for the purposes set forth.

In testimony whereof I affix my signature in the presence of two witnesses.

WILLIAM B. MAY.

Witnesses:
HARRY J. DOUGLAS,
ELECTA B. WARD.